F. TIEMANN.
FILTER.
APPLICATION FILED FEB. 24, 1906.
899,194.
Patented Sept. 22, 1908.
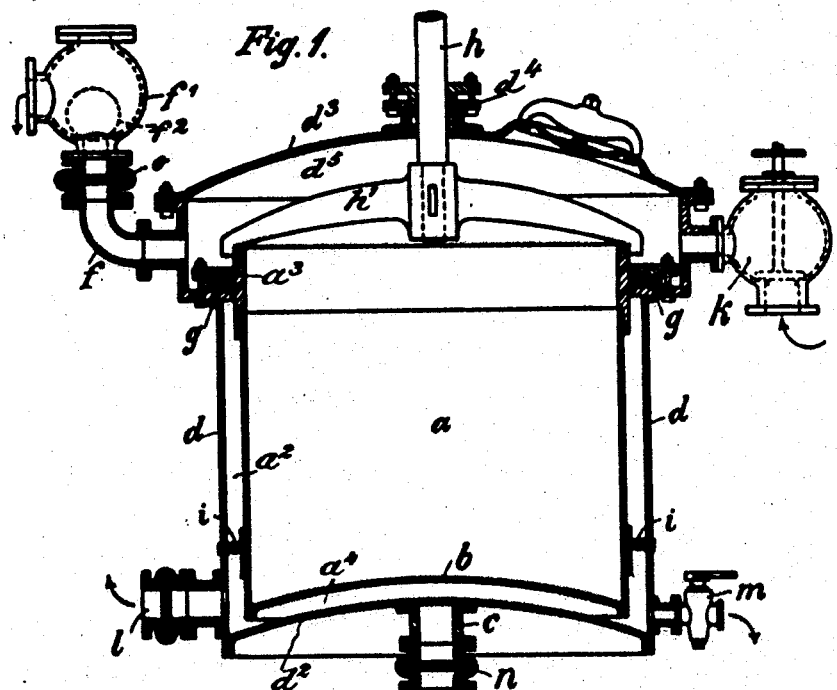
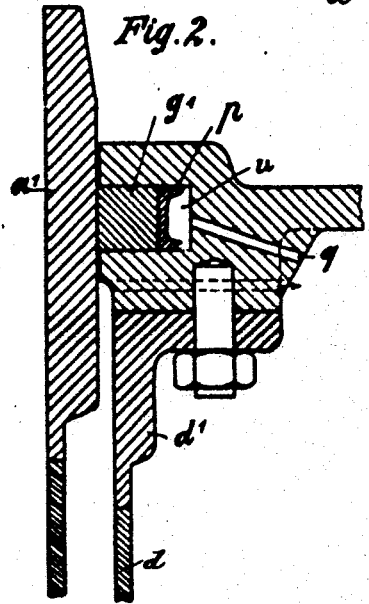
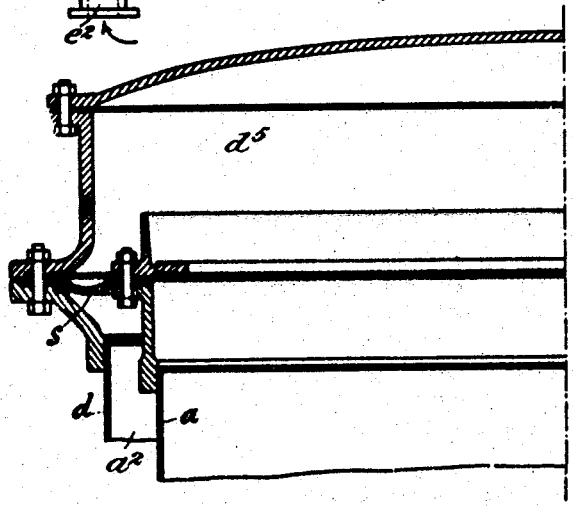
Witnesses:
Arthur E. Jumple
H. R. Schulz
Inventor
Fritz Tiemann
by Frank v. Briesen
Att'y

UNITED STATES PATENT OFFICE.

FRITZ TIEMANN, OF BERLIN, GERMANY.

FILTER.

No. 899,194.   Specification of Letters Patent.   Patented Sept. 22, 1908.

Application filed February 24, 1908. Serial No. 417,316.

*To all whom it may concern:*

Be it known that I, FRITZ TIEMANN, a subject of the King of Prussia, German Empire, residing at Berlin, Germany, have invented new and useful Improvements in Filters, of which the following is a specification.

This invention relates to a filter which is so constructed that the filtering material contained therein may be readily and effectively cleaned in a novel manner. For this purpose the filtering material is inclosed in a hollow plunger which is at rest during the filtering operation. When, however, the filtering material is to be cleaned, the plunger is reciprocated to force the water into the plunger and through the filtering material.

In the accompanying drawings: Figure 1 is a vertical section through my improved filter; Fig. 2 an enlarged section through a modification of the packing between plunger and cylinder, and Fig. 3 a similar section through a further modification.

A shell or cylinder $d$, is provided with a concave bottom $d^2$, and a bulged top $d^3$. Within cylinder $d$, is inclosed a cylindrical container or plunger $a$, the outer diameter of which is smaller than the inner diameter of cylinder $d$, so that an annular clearance $a^2$, is formed between them. Plunger $a$, is centered within cylinder $d$, by a series of guide rollers $i$, while upper rim $a^3$, of vessel $a$, engages a packing ring $g$, secured to cylinder $d$. Plunger $a$, is open on top and is provided with a perforated bottom $b$, curved concentric to bottom $d^2$, of cylinder $d$. To head $a^3$, of vessel $a$, is secured a bail $h'$, fast on the lower end of a vertical rod $h$. The latter passes through a suitable stuffing box $d^4$, of cover $d^5$, and receives reciprocating movement by any suitable means, (not shown), for a purpose hereinafter described. Plunger $a$, is filled with pulp or filtering material, supported upon perforated bottom $b$.

The liquid to be filtered enters upper compartment $d^5$, of cylinder $d$, above plunger $a$, through an inlet valve $k$. It thence flows into plunger $a$, and through the filtering material contained therein, to pass through perforated bottom $b$, into the lower part $a^4$, of cylinder $d$. The filtrate is finally discharged from the apparatus by a valve-controlled outlet 1. During this operation any direct flow of the liquid from compartment $d^5$, into annular space $a^2$, is prevented by packing ring $g$. This ring constitutes a partition, which divides the space surrounding piston $b$, into the upper compartment or water chamber $d^5$, and into a lower water chamber $a^2$, $a^4$.

The water for cleaning the filtering material enters lower compartment $a^4$, of cylinder $d$, through pipe $c$, controlled by a slide-valve $n$, and communicating with housing $e$. This housing contains a ball- or check-valve $e'$, adapted to close against the mouth of a fresh water inlet $e^2$. Compartment $d^5$, has an outlet $f$, controlled by slide-valve $o$, and connected to a check-valve $f'$, containing ball $f^2$. Cylinder $d$, is further provided near its bottom with a cock $m$, for the discharge of the cleaning water remaining in the cylinder after the cleaning operation has been finished.

If it is desired to clean the filtering material, valves $k$, $l$, and cock $m$, must be closed, while valves $n$, and $o$, are opened. Plunger $a$, is now vertically reciprocated by rod $h$. It will be seen that at each up stroke of plunger $a$, water is sucked through valve $e$, into the communicating spaces $a^4$, $a^2$. At the succeeding down stroke, check-valve $e'$, will close inlet $e^2$, so that the water is forced to pass upwards through perforated bottom $b$, and through the filtering material contained in plunger $a$. By repeating this operation a suitable number of times, the filtering material will be thoroughly cleaned.

When the water discharged from valve $f'$, runs sufficiently clean, reciprocating rod $h$, is arrested, valves $n$, and $o$, are closed, and cock $m$, is opened to permit the discharge of the cleaning water from cylinder $d$. Valve $m$, is finally closed, and valves $k$, and $l$, are opened, to re-start the filtering process, as above described.

In Fig. 2, rim $a'$, of plunger $a$, engages a packing ring $g'$, made preferably of self-lubricating material. Ring $g'$, is received within a circumferential groove $u$, of cylinder head $d'$, and is engaged by a ring $p$, which is forced inwards by a suitable pressure medium such as water under pressure entering groove $u$, through duct $q$.

In Fig. 3, space $a^2$, and compartment $d^5$, are shown to be separated by a flexible diaphragm $s$, in lieu of the packing ring $g$, shown in Fig. 1.

I claim:

A device of the character described, comprising a cylinder, an inclosed hollow perforated plunger, filtering material within the plunger, means for reciprocating the plunger, an upper water chamber and a lower water chamber between cylinder and plunger, a partition intermediate said chambers, a water inlet and a valve-controlled water outlet communicating with the upper chamber, and a water outlet and a valve-controlled water inlet communicating with the lower chamber, substantially as specified.

In witness whereof I have hereunto signed my name in the presence of two subscribing witnesses.

FRITZ TIEMANN.

Witnesses:
HENRY HASPER,
WOLDEMAR HAUPT.